(12) United States Patent
Singh et al.

(10) Patent No.: US 9,929,989 B2
(45) Date of Patent: Mar. 27, 2018

(54) INTEROPERABILITY WITH LEGACY CLIENTS

(71) Applicant: Microsoft Technology Licensing, LLC, Redmond, WA (US)

(72) Inventors: Jaskaran Singh, Redmond, WA (US); Szymon Madejczyk, Sammamish, WA (US); Roberto Ribeiro da Fonseca Mendes, Seattle, WA (US); Jaya Matthew, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 14/842,023

(22) Filed: Sep. 1, 2015

(65) Prior Publication Data

US 2017/0063743 A1    Mar. 2, 2017

(51) Int. Cl.
  *G06F 15/16* (2006.01)
  *H04L 12/58* (2006.01)
  *G06F 9/54* (2006.01)

(52) U.S. Cl.
  CPC .............. *H04L 51/046* (2013.01); *G06F 9/54* (2013.01)

(58) Field of Classification Search
  CPC ............................... H04L 51/046; G06F 9/54
  USPC ....................................................... 709/206
  See application file for complete search history.

(56) References Cited

U.S. PATENT DOCUMENTS

| 4,653,048 A | 3/1987 | Anderson et al. |
|---|---|---|
| 5,197,000 A | 3/1993 | Vincent |
| 5,813,013 A | 9/1998 | Shakib et al. |
| 5,905,863 A | 5/1999 | Knowles et al. |
| 6,272,074 B1 | 8/2001 | Winner |
| 7,016,909 B2 | 3/2006 | Chan et al. |
| 7,108,173 B1 | 9/2006 | Wang et al. |
| 7,343,312 B2 | 3/2008 | Capek et al. |
| 7,370,282 B2 | 5/2008 | Cary |
| 7,490,089 B1 | 2/2009 | Georgiev |
| 7,499,942 B2 | 3/2009 | Simison et al. |
| 7,743,098 B2 | 6/2010 | Anglin et al. |
| 7,818,377 B2 | 10/2010 | Whitney |
| 7,865,872 B2 | 1/2011 | Chamieh et al. |
| 8,495,656 B2 | 7/2013 | Johnson et al. |
| 8,577,959 B2 | 11/2013 | Pandey et al. |
| 8,612,876 B2 | 12/2013 | Barnett et al. |

(Continued)

FOREIGN PATENT DOCUMENTS

WO    WO9922324    5/1999

OTHER PUBLICATIONS

U.S. Appl. No. 14/842,013, filed Sep. 1, 2015, Singh et al.

(Continued)

*Primary Examiner* — Wing F Chan
*Assistant Examiner* — Joseph Maniwang
(74) *Attorney, Agent, or Firm* — Workman Nydegger (57) ABSTRACT

A method includes identifying a series of events formatted for a modern system. The series of events includes a master message usable by modern systems. The master message includes default information for all events in the series. The method further includes identifying a plurality of instance messages. Each of the instance messages includes default information and exception information for a given event in the series of events. The method further includes sending both the master message and the instance messages to other systems without regard to whether the other systems are modern or legacy systems.

21 Claims, 8 Drawing Sheets

(56) References Cited

U.S. PATENT DOCUMENTS

| | | |
|---|---|---|
| 8,838,461 B2 | 9/2014 | Beebe et al. |
| 8,850,330 B2 | 9/2014 | Coppinger et al. |
| 8,924,269 B2 | 12/2014 | Seubert et al. |
| 2003/0154116 A1 | 8/2003 | Lofton |
| 2003/0225732 A1 | 12/2003 | Chan et al. |
| 2003/0233265 A1 | 12/2003 | Lee et al. |
| 2005/0192857 A1 | 9/2005 | Levine |
| 2005/0222971 A1 | 10/2005 | Cary |
| 2006/0031311 A1 | 2/2006 | Whitney et al. |
| 2006/0200374 A1 | 9/2006 | Nelken |
| 2007/0005409 A1 | 1/2007 | Boss et al. |
| 2007/0079260 A1 | 4/2007 | Bhogal et al. |
| 2007/0150503 A1 | 6/2007 | Simison et al. |
| 2008/0114636 A1 | 5/2008 | Nellutla |
| 2008/0147469 A1 | 6/2008 | Murillo et al. |
| 2008/0168146 A1 | 7/2008 | Fletcher |
| 2009/0018878 A1 | 1/2009 | Baron et al. |
| 2009/0248474 A1 | 10/2009 | Fried et al. |
| 2010/0254389 A1 | 10/2010 | Singh et al. |
| 2010/0257404 A1 | 10/2010 | Singh et al. |
| 2010/0262926 A1 | 10/2010 | Gupta et al. |
| 2011/0015961 A1 | 1/2011 | Chan |
| 2011/0054976 A1 | 3/2011 | Adler et al. |
| 2011/0202999 A1 | 8/2011 | Logan et al. |
| 2011/0225015 A1 | 9/2011 | Spivack et al. |
| 2011/0247017 A1 | 10/2011 | Hopkins et al. |
| 2011/0320237 A1 | 12/2011 | Beaman et al. |
| 2012/0221369 A1 | 8/2012 | Braatem et al. |
| 2012/0304088 A1 | 11/2012 | Kho et al. |
| 2013/0067024 A1 | 3/2013 | Vasters |
| 2013/0144672 A1 | 6/2013 | Chakra et al. |
| 2013/0246526 A1 | 9/2013 | Wu et al. |
| 2013/0290058 A1 | 10/2013 | Gray et al. |
| 2013/0298043 A1 | 11/2013 | Bailey |
| 2014/0172483 A1 | 6/2014 | Bellers et al. |
| 2014/0229560 A1 | 8/2014 | Gray |
| 2014/0278675 A1 | 9/2014 | DeLuca et al. |
| 2014/0282005 A1 | 9/2014 | Gutowitz |
| 2014/0310045 A1 | 10/2014 | Meltzer et al. |
| 2015/0058425 A1 | 2/2015 | Nathan et al. |

OTHER PUBLICATIONS

U.S. Appl. No. 14/842,036, filed Sep. 1, 2015, Singh et al.
U.S. Appl. No. 14/842,084, filed Sep. 1, 2015, Singh et al.
U.S. Appl. No. 14/842,097, filed Sep. 1, 2015, Singh et al.
"WebEx Meeting Center User Guide", Published on: Aug. 1, 2014. Available at <<http://www.cisco.com/c/dam/en/us/td/docs/collaboration/meeting_center/wx_mc_host_ug.pdf>>.
Lefkovics, William, "How can I establish recurring meetings with variations in Microsoft Outlook?", Published on: Sep. 29, 2011. Available at <<http://windowsitpro.com/outlook/q-how-can-i-establish-recurring-meetings-variations-microsoft-outlook>>.
Sen, et al., "Satisfying user Preferences while Negotiating Meetings", In International Journal of Human-Computer Studies, vol. 47, Issue 3, Sep. 1997, 34 pages.
International Search Report and Written Opinion issued in PCT Application No. PCT/US2016/049409 dated Nov. 10, 2016.
International Search Report and Written Opinion issued in PCT Application No. PCT/US2016/049347 dated Nov. 30, 2016.
Linthicum "Enterprise Application Integration: Chapter 13: Message Brokers and B2B Application Integration" May 1, 2000, pp. 231-236.
International Search Report and Written Opinion issued in PCT Application No. PCT/US2016/049344 dated Dec. 7, 2016.
Microsoft: "How To: Create a Recurring Series by using EWS in Exchange", Documentation online of Office Dev. Center, Mar. 9, 2015, pp. 1-8.
Microsoft: "How To: Update a Recurring Series by using EWS in Exchange", Documentation online of Office Dev. Center, dated May 30, 2014, pp. 1-5.
Microsoft: "How To: Update a Recurring Series by using EWS", Documentation online of Office Dev. Center, May 7, 2014, pp. 1-5.
Microsoft: "How To: Access a Recurring Series by using EWS", Documentation online of Office Dev. Center, Mar. 9, 2015, pp. 1-7.
Microsoft: "Recurrence Patterns and EWS Learn About Recurrence Patterns and Recurring Series in Exchange" Documentation Online of Office Dev. Center, Mar. 9, 2015, pp. 1-9.
Microsoft: "Calendars and EWS in Exchange" Documentation Online of Office Dev. Center, Mar. 9, 2015, pp. 1-4.
Smith "Exchange Server 2016 Architecture", Microsoft TechNet, May 5, 2015, pp. 1-8.
International Search Report and Written Opinion issued in PCT/US2016/049348 dated Jan. 24, 2017.
Office Action dated Apr. 17, 2017 cited in U.S. Appl. No. 14/842,036.
Office Action dated Apr. 6, 2017 cited in U.S. Appl. No. 14/842,084.
Second Written Opinion Issued in PCT Application No. PCT/US2016/049347, dated Mar. 6, 2017, 6 Pages.
"Second Written Opinion Issued in PCT Application No. PCT/US2016/049348", dated May 12, 2017, 7 Pages.
"Before Your Calendar Appointments are migrated to the New Exchange Service", Retrieved on: Jul. 8, 2015 Available at: http://reports.is.ed.ac.uk/areas/itservices/colltools/exseed/help-and-support/migrations/exchange-premigration.pdf.
"Irregular Recurring Appointments and Meetings", Published on: Jul. 7, 2011 Available at: http://www.msoutlook.info/question/549.
"Recurrence patterns and EWS", Published on: Sep. 3, 2014 Available at: https://msdn.microsoft.com/en-us/library/office/dn727655(v=exchg.150).aspx.
"Create a Repeating Event", Published on: Apr. 26, 2015 Available at: https://support.google.com/calendar/answer/37115?hl=en.
Glover, Ken, "Dealing with Documents for Irregularly Recurring Meetings", Published on: Apr. 13, 2012 Available at: http://words.usask.ca/sharepointsig/2012/04/13/dealing-with-documents-for-irregularly-recurring-meetings/.
Nomura, et al., "A Practical Calendaring System Conforming with Ambiguous Pattern of Recurring Tasks", In Proceedings of 14th International Conference on Network-Based Information Systems, Sep. 7, 2011, pp. 553-558.
Hollington, Jesse, "Scheduling Irregularly Recurring Events" Published on: Oct. 19, 2012 Available at: http://www.ilounge.com/index.php/articles/comments/scheduling-irregularly-recurring-events.
"Recurring Outlook Appointments with an Irregular Pattern", Published on: Mar. 21, 2014 Available at: http://www.alandaletraining.com/free-tips/recurring-outlook-appointments-with-an-irregular-pattern.
"Irregular Recurring Meetings", Retrieved on: Jul. 8, 2015 Available at: http://www.tru.ca/_shared/assets/irregular_recurring_meetings28463.pdf.
International Search Report and Written Opinion issued in PCT Application No. PCT/US2016/049346 dated Oct. 4, 2016.
Borestein et al. "MIME (Multipurpose Internet Mail Extensions) Part One: Mechanisms for Specifying and Describing the Format of Internet Message Bodies" Sep. 1993.
Second Written Opinion Issued in PCT Application No. PCT/US2016/049409 dated Jun. 23, 2017.
Second Written Opinion Issued in PCT Application No. PCT/US2016/049346 dated Aug. 17, 2017.
U.S. Appl. No. 14/842,013, filed Jul. 25, 2017, Office Action.
International Preliminary Report on Patentability Issued in PCT Application No. PCT/US2016/049348, dated Oct. 13, 2017, 7 Pages.
Microsoft "Mailbox synchronization and EWS in Exchange", Retrieved From: <<https://msdn.microsoft.com/en-us/library/office/dn440952(v=exchg.150).aspx>>, Mar. 9, 2015, 4 Pages.
Microsoft "Notification subscriptions, mailbox events, and EWS in Exchange", Retrieved From <<https://msdn.microsoft.com/en-us/library/office/dn458791(v=exchg.150).aspx>>, Mar. 9, 2015, 4 Pages.
Second Written Opinion Issued in PCT Application No. PCT/US2016/049344, dated Sep. 6, 2017, 13 Pages.

(56) References Cited

OTHER PUBLICATIONS

"International Preliminary Report on Patentability Issued in PCT Application No. PCT/US2016/049347", dated Sep. 29, 2017, 8 Pages.
"International Preliminary Report on Patentability issued in PCT Application No. PCT/US2016/049409," dated Nov. 14, 2017 (Copy Attached).
"International Preliminary Report on Patentability Issued in PCT Application No. PCT/US2016/049344 dated Dec. 4, 2018", (Copy Attached).
"International Preliminary Report on Patentability Issue in PCT Application No. PCT/US2016/049346," dated Dec. 12, 2017, 7 pages.
"Corrected Notice of Allowance Issued in U.S. Appl. No. 14/842,084", dated Dec. 18, 2017, 2 Pages.
"Notice of Allowance Issued in U.S. Appl. No. 14/842,036", dated Nov. 30, 2017, 4 Pages.

|        | Monday | Tuesday | Wednesday | Thursday | Friday |
|--------|--------|---------|-----------|----------|--------|
| 10 AM  | Metadata for the Series |||| |
| 11 AM  |        |         |           | 212      |        |
| 12 PM  | Instance |       | Instance  |          |        |
| 1 PM   | 216-1  |         | 216-2     | Instance |        |
| 2 PM   |        |         |           | 216-3    |        |

INTEROPERABILITY WITH LEGACY CLIENTS

BACKGROUND

Background and Relevant Art

Computers and computing systems have affected nearly every aspect of modern living. Computers are generally involved in work, recreation, healthcare, transportation, entertainment, household management, etc.

As computer technology advances, new features may be added to new (referred to herein as modern) versions of existing systems. As these features are added, there may be older (referred to herein as legacy) versions of the existing systems that are not able to natively implement the new features. However users of these legacy versions of systems may wish to take advantage of the new features in the modern versions of the systems.

For example, modern versions of scheduling systems (such as the calendar functionality included in Microsoft Exchange Server and Microsoft Outlook client available from Microsoft Corporation of Redmond, Wash.) may include functionality that allows advanced scheduling features, such as the ability to have exceptions for appointments in a series of appointments, modify individual appointments in a series of appointments, add additional appointment instances to a series of appointments, collaborate on appointment details, etc. In some situations a server may have this functionality enabled and modern clients can make use of the functionality while legacy clients are unable to make use of the functionality, even though the server supports it. This can create difficulties for users of both the modern clients and the legacy clients. In particular, a user at a modern client may utilize some of the functionality of the modern server and expect other users, including users at legacy clients, to be aware of the utilization. For example, a user at a modern client may update an instance of a series of appointments. Other users using modern clients would be made aware of the update, but users on legacy clients may not be made aware of the update, or may be made aware of the update in a way that breaks the series of appointments as a series. It would be useful to implement systems where modern and legacy clients could both implement new functionality and still be able to interact with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for facilitating usage with both modern and legacy systems. The method includes identifying a series of events formatted for a modern system. The series of events includes a master message usable by modern systems. The master message includes default information for all events in the series. The method further includes identifying a plurality of instance messages. Each of the instance messages includes default information and exception information for a given event in the series of events. The method further includes sending both the master message and the instance messages to other systems without regard to whether the other systems are modern or legacy systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages or may be learned may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
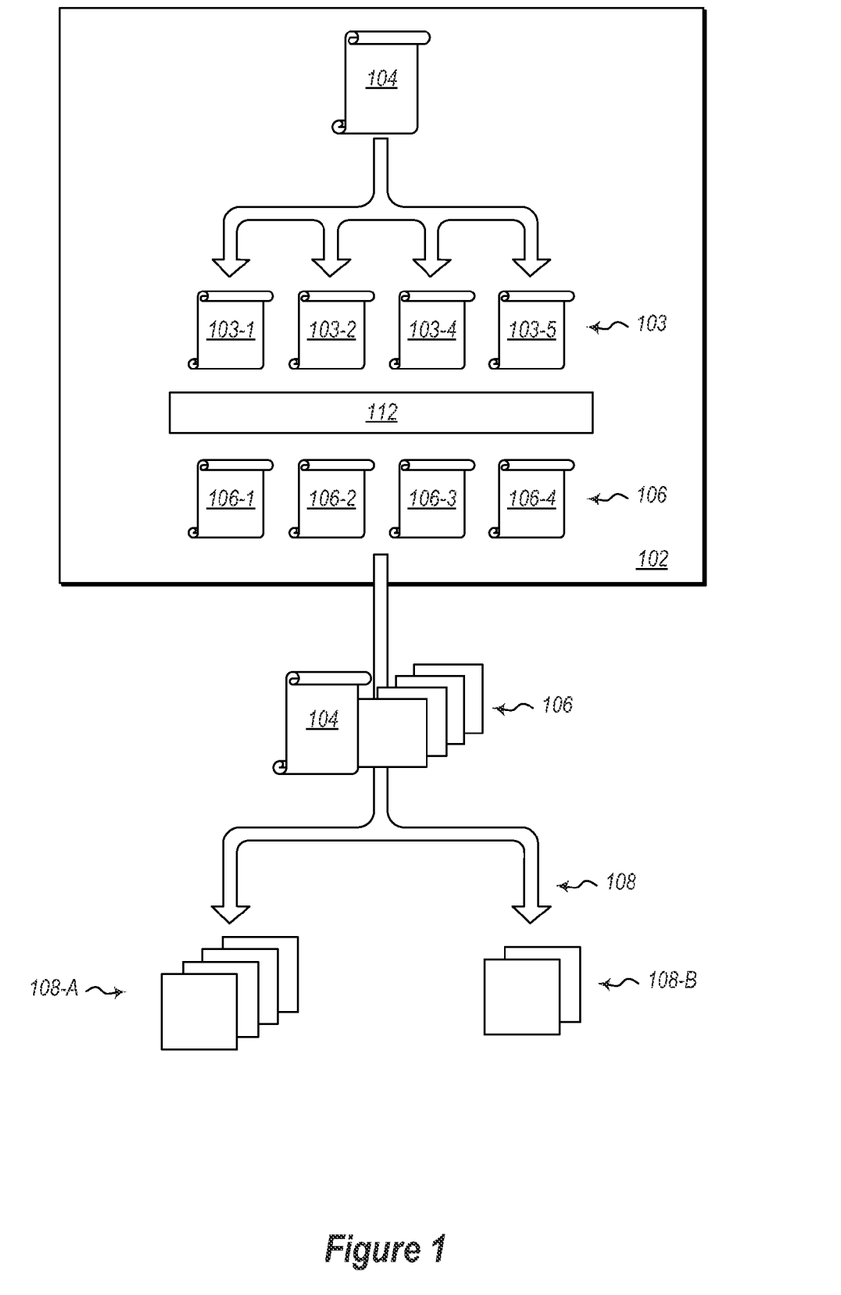
FIG. 1 illustrates a server configured to create instance messages from a master message.

As will be illustrated in detail below, non-pattern recurrence is a new type of series in which for one or more properties (such as day of the week, time of day, invitees, etc.) there is no pattern, but for which there are multiple instances of an event. There is no restriction on how many instances of an event can happen on a day or on moving the instances across exceptional boundaries. For example, there may be two instances: 1st July and 5th July. If one desires to move the instance on the 1st to any day after the 5th, this is not possible in a traditional recurring series implemented on a legacy calendaring system. However, as illustrated in FIG. 1, embodiments herein can implement this functionality, and other modern functionality, on the server side of a server 102 for use by modern clients 108-A and at the same time not break any legacy clients 108-B.

This can be done by, at a server 102, representing each of the instances of the series as individual partial items 103-1, 103-2, 103-3, and 103-4 which may store minimal information, such as for example, only the date, time, and any property which does not match the corresponding property on a series master message 104 (which is used as a template). As legacy clients 108-B (from among the clients 108) will not be able to interpret the partial items 103-1, 103-2, 103-3, and 103-4 or the series master message 104, which is hidden to the legacy clients 108-B, the partial items 103 are made into full event items using an agent, such for example, using a background service 112 (and/or an in-line API, as illustrated in more detail below) to create a plurality of instance messages 106-1, 106-2, 106-3, and 106-4.

Each instance message includes all default values for properties from the master message 104 and any items specific properties, called exceptions herein, for corresponding items in the series.

The master message 104 and all instance messages 106 are sent to all clients in the set of clients 108 irrespective of whether those clients are modern clients 108-A which are able to implement advanced functionality and able to make use of the new data formats in the master message 104 or legacy clients 108-B which are not able to make use of data formats in the master message 104. In this way, the modern clients 108-A can obtain data from the master message 104 and implement the advanced functionality provided by the server 102, i.e., using a single message container to represent series defaults and exceptions, and simply discard the instance messages 106. Additionally, the legacy clients 108-B which are not able to implement the advanced functionality provided by the server 102 with respect to using a single message, because they need individual messages for each instance, will have the messages 106 for the instances. In this way, modern clients 108-A and legacy clients 108-B can both be used in the context of the modern server 102 such that the clients can continue to interact with each other, even though they operate on different underlying principles.

Illustrating additional details, the series master message 104 is used to store any action which is propagated to each instance message in the instance messages 106 for interoperability with legacy clients 108-B. This way the modern clients 108-A get a model where series updates just require changing one item (i.e., the series master message 104) and at the same time legacy clients can still understand each individual instance of the series by virtue of the changes to the master message 104 being propagated to the plurality of instance messages 106.

Thus, embodiments illustrated herein implement a system where a series of events can be propagated to both modern systems and legacy systems. In particular, a series of events can be formatted for a modern system. The series of events includes a master message 104 that includes default information for all events in the series as well as optionally exceptions to the default information for individual events in the series of events. A plurality of instance messages 106 are created from the master message 104. Each instance message includes default information and exception information for a given event in the series of events. The instance messages are sent from a modern server 102 to other systems without regard to whether the other systems are modern or legacy systems. In this way, modern functionality can be propagated to both modern and legacy systems.

Notably, while FIG. 1 illustrates the modern server 102 coupled directly to the clients 108, it should be appreciated in some embodiments, modern or legacy servers may actually be connected between the modern server 102 and the clients. In particular, the modern server 102 may send the messages 104 and 106 to intervening servers, which can then provide them to the clients 108. Because both the master message 104 and the instance messages 106 are provided, the intervening servers do not need to be modern servers with advanced functionality, but rather can be legacy servers that are capable of forwarding the messages 104 and 106 to clients (either modern or legacy). Thus, for example, a modern client may be coupled to a legacy server, and if the legacy server is connected to the modern server 102, the modern clients coupled to the legacy server will still be able to implement the advanced functionality by receiving the master message 104 from the legacy server.

Each instance message in the instance messages 106 may be created using the master message 104. In particular, the instance messages 106 can be created by using the default information and the exception information contained in the master message 104. For example, the instance message will be created using the default information for any data items where no exception information exists in the master message for the event corresponding to the instance message. If exception information exists in the master message for an instance of an event, the exception information will be used instead of the default information.

In some embodiments, the instance messages 106 are created using the default information from the master message in combination with exception information received from a user. For example, a user at a legacy client may wish to update an event in the series of events. This may be done by the legacy client sending user input in a response to one of the instance messages. The system may receive this user input, and use this input to update the instance message for that event. This instance message can then be resent to the various clients (both modern and legacy). Further, this update may be later synched with the master message 104.

The following illustrates additional details with respect to updating an event in a series of events.

Modern calendaring systems have a notion of recurring meetings in which a user can define a pattern. For example, typically a user can define a calendar event to occur daily, weekly, monthly, or yearly. This functionality has existed for quite some time in calendaring systems whereby the systems determine, by following various rules, when items should be placed on a calendar. The recurrences can be limited to some user defined time frame or in some cases perpetual. Typically, a series of events are contained in a single message delivered by a calendaring server which can be understood by clients of the calendaring server.

Previously, users have been able to modify individual instances in the series, but with some risk that those modifications will be lost. For example, a user may modify an individual instance, but later when a change is made to the series itself, the modification will be lost. Thus, for example, a series may have a meeting scheduled with a default value of every Tuesday at 11:00 AM. A change may be made to the series to have one series exception instance of the meeting at 10:00 AM. Later, the series may be changed to have the default value be at 12:00 PM. In legacy systems, this would cause the exception information to be lost, and all meetings to be at 12:00 PM.

However, a modern calendaring system has implemented functionality where non-pattern recurrence can be combined with the recurring model to have instances of events that do not meet the defined recurrence pattern be persisted. For example, embodiments may allow for having two instances on the same day, moving exceptions across instance boundaries, etc., and for these exceptions to be persisted even when changes are made to default values. For example, a series may be for a weekly meeting at 11:00 AM every Tuesday. There may be a desire to update one of the meetings to a series exception instance of Wednesday at 3:00 PM. When the series is later changed to have the default value of the meeting be at 12:00 PM, the series exception instance at Wednesday at 3:00 PM will not be lost. Users of legacy systems may wish to take advantage of this functionality as well. The following illustrates how this is accomplished by embodiments described herein.

One embodiment illustrated herein is able to persist exception information for legacy systems by creating an instance message when an instance in a series is updated to change a value for the instance from a default value to an exception value for the instance.

Figure 2A:
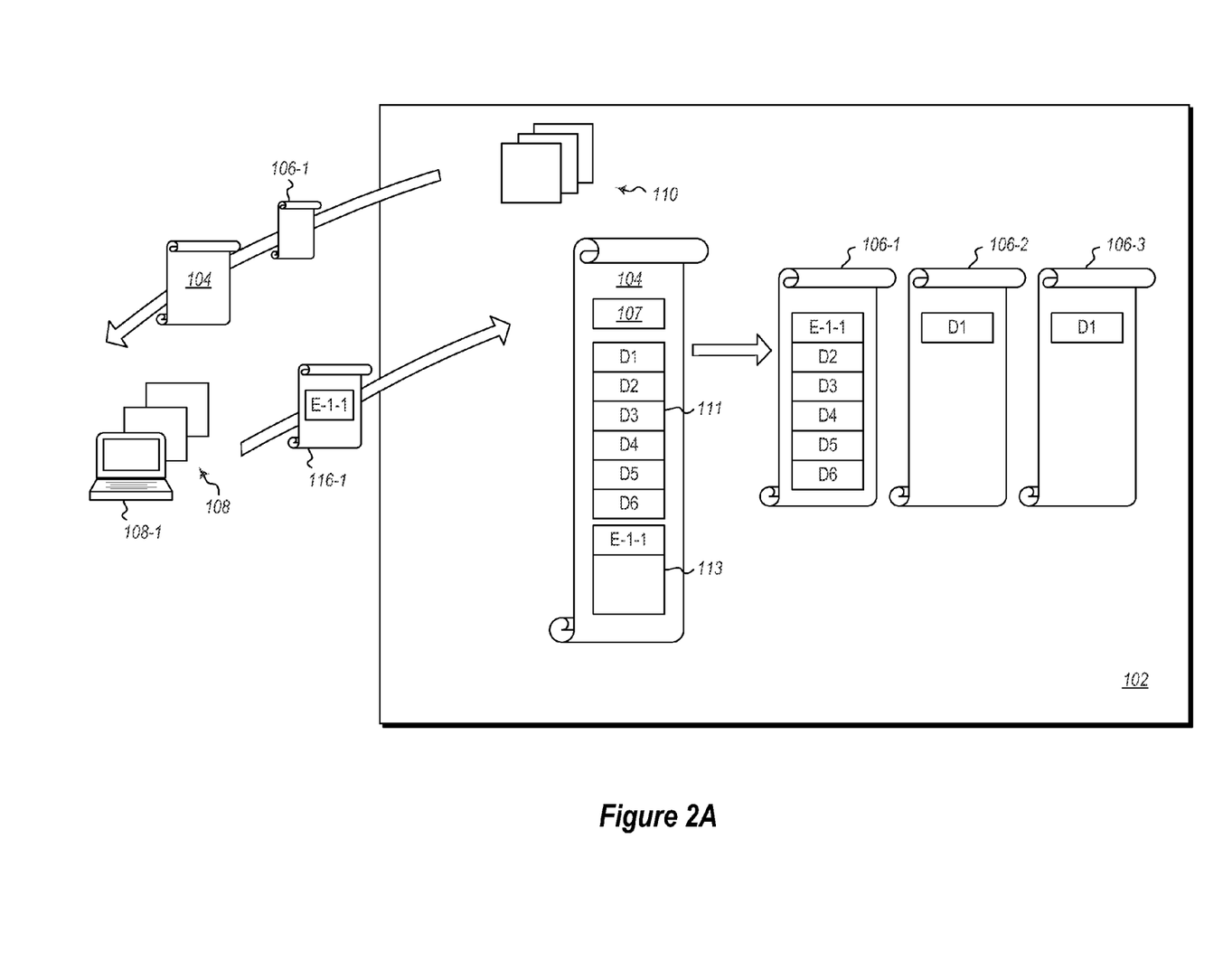
FIG. 2A illustrates adding a new instance message for changes to a series.

For example, FIG. 2A illustrates a modern server 102. The modern server 102 is able to handle a series with non-pattern recurrences and persist any non-pattern recurrences when default values are changed for the entire series. Such functionality is illustrated below for reference and understanding, however, it should be appreciated that embodiments may be implemented in other contexts.

FIG. 2A illustrates a master message 104. The master message 104, includes a view 107, default information 111, and exception information 113.

The view 107 defines a graphical view of calendar items to be displayed on a calendar user interface at a client such as one of the clients 108. This may define graphically how and where events on a calendar may be placed on the graphical user interface at a client. This may include information for all instances in a series such that a client can use the view 107 to graphically render all instances in a given series. This information can be used by legacy clients or modern clients to render events on a calendar. The view 107 can include exceptional view items as well which are readable by both modern and legacy clients.

The default information 111 includes default values for instances in the series. For example, a given default value may include a meeting location, a list of attendees, a default day, a default time, or other default value. These default values are used for any instances in the series in which there are no exceptions. The default information is viewable by both legacy and modern systems.

The exception information 113 identifies any exception values to default values for a given instance. Thus, for example, an exception may identify that the first instance in a series occurs on a Wednesday instead of a Tuesday. In some embodiments, the exception information may be included specifically in the master message 104 while in other embodiments, the exception information may be included by virtue of pointers to locations where the actual exception values are stored. In the illustrated example, the exception information 113 is persistable and readable for modern systems, but not for legacy systems.

Embodiments herein can create individual instance messages readable by legacy systems that can supersede and/or replace exception noted in the master message 104. In particular, the embodiments herein are able to receive user input changing an instance in a series, and as a result create an instance message that is readable by a legacy client. The instance message can be maintained separately, such that updates to default items do not destroy the instance message, and thus, the exception for a particular instance can be maintained.

For example, FIG. 2A illustrates that the server 102 receives a user change message 116-1 from a client 108-1. The user change message 116-1 includes an exception value E1-1 that is an exception value that replaces the default value D1 for one instance in a series. For example, assuming a series of four instances, the exception value E1-1 may be meant to replace the default value D1 for the first instance in the series. The other instances would retain the default value D1. All instances, assuming no other exceptions, would retain the other default values D2, D3, D4, D5 and D6. The client 108-1 can be a legacy client or a modern client. At the server 102, the server 102 updates the master message 104 to include the exception E1-1 in the exception information 113. However, the default value D1 is still retained for use by other instances in the series.

The server also creates a new instance message 106-1. The instance message 106-1 includes the exception value E1-1 as well as the default values D2, D3, D4, D5 and D6. The view 107 can be updated as needed as well.

As noted above, in some embodiments, the exception value E1-1 can be included in the master message 104 by using a pointer. In some embodiments, this may be done by using a pointer directly to the exception value E1-1 in the instance message 106-1. This can be done to conserve storage space at the server 102.

The master message 104 and instance message 106-1 can then be sent to the clients 108 that are interested in the series. Any modern clients in the clients 108 can use the master message to update the series with the instance exception by reading the exception information 113 and will not need the instance message 106-1, except insofar as the master message 104 points to values in the instance message 106-1. The modern clients will not use the default values from the instance message 106-1

In some embodiments, the master message 104 and any instance messages can be sent to the clients 108 by placing the messages in mailboxes 110 for the clients 108.

Legacy clients, on the other hand, in the clients 108 will use what information they can from the master message 104, in the present example, the last three instances while using the instance message 106-1 for the first instance in the series of events.

As will now be illustrated, the instance message 106-1 can be used to persist the exception value E1-1, even when changes are made to the series as a whole.

Figure 2B:
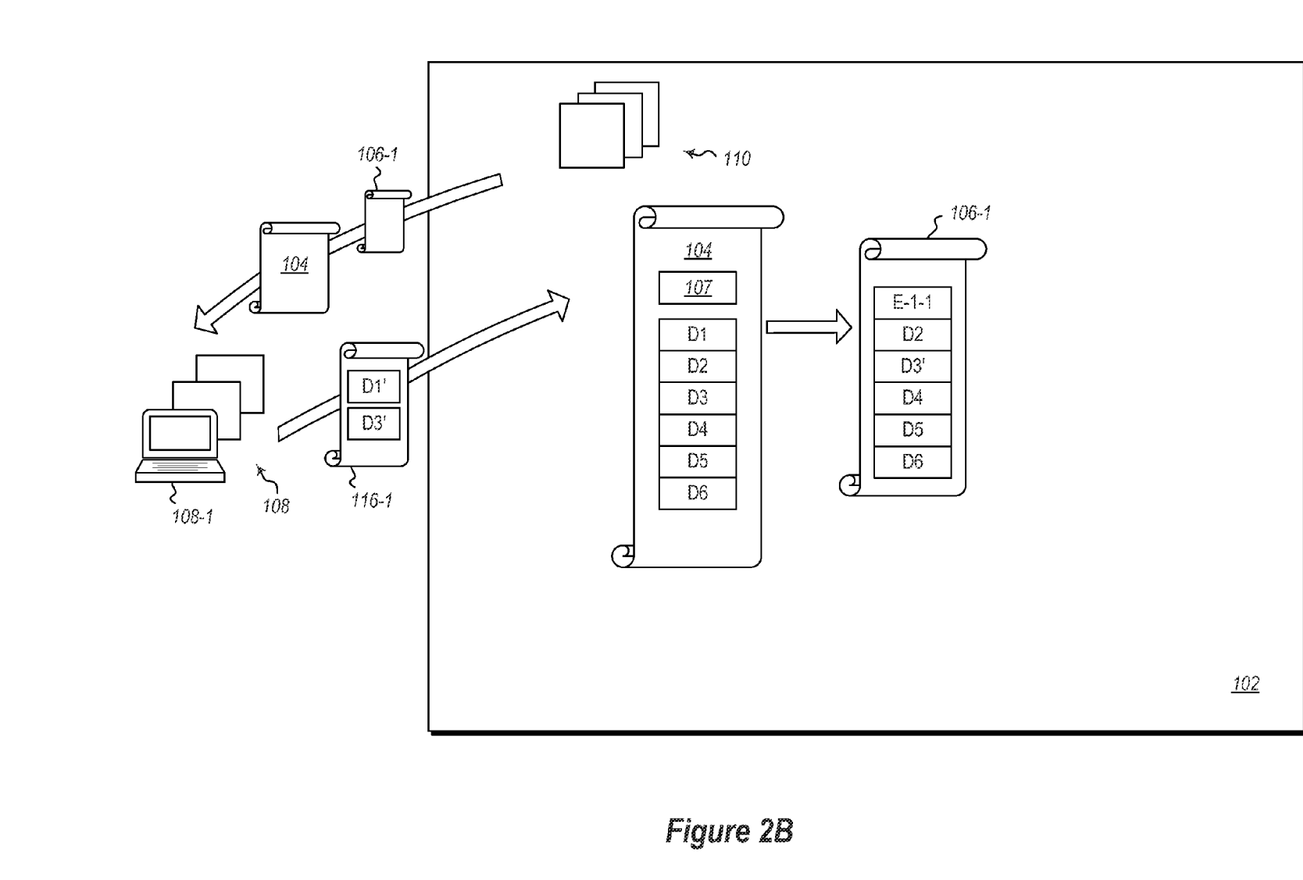
FIG. 2B illustrates updating default values in instance messages.

For example, FIG. 2B illustrates an example where the client 108-1 sends a user change message 116 that is intended to update the default value D1 to D1' and D3 to D3'. In this example, the server recognizes that this update is an update to the entire series and not just an update to a particular instance in the series. Thus, the server 102 will update the master message 104 to replace the value D1 with the value D1' and the value D3 with the value D3'. Because the instance message 106-1 already has an exception value E1-1 to D1 the instance message 106-1 will not be updated with the value of D1'. However, because the instance message 106-1 includes the default value D3, the instance message 106-1 will be updated to include the default value D3' in place of the default value D3. These messages, once updated, can then be propagated to the clients 108, where the clients 108 can use them to update series information at the clients as illustrated above.

Figure 2C:
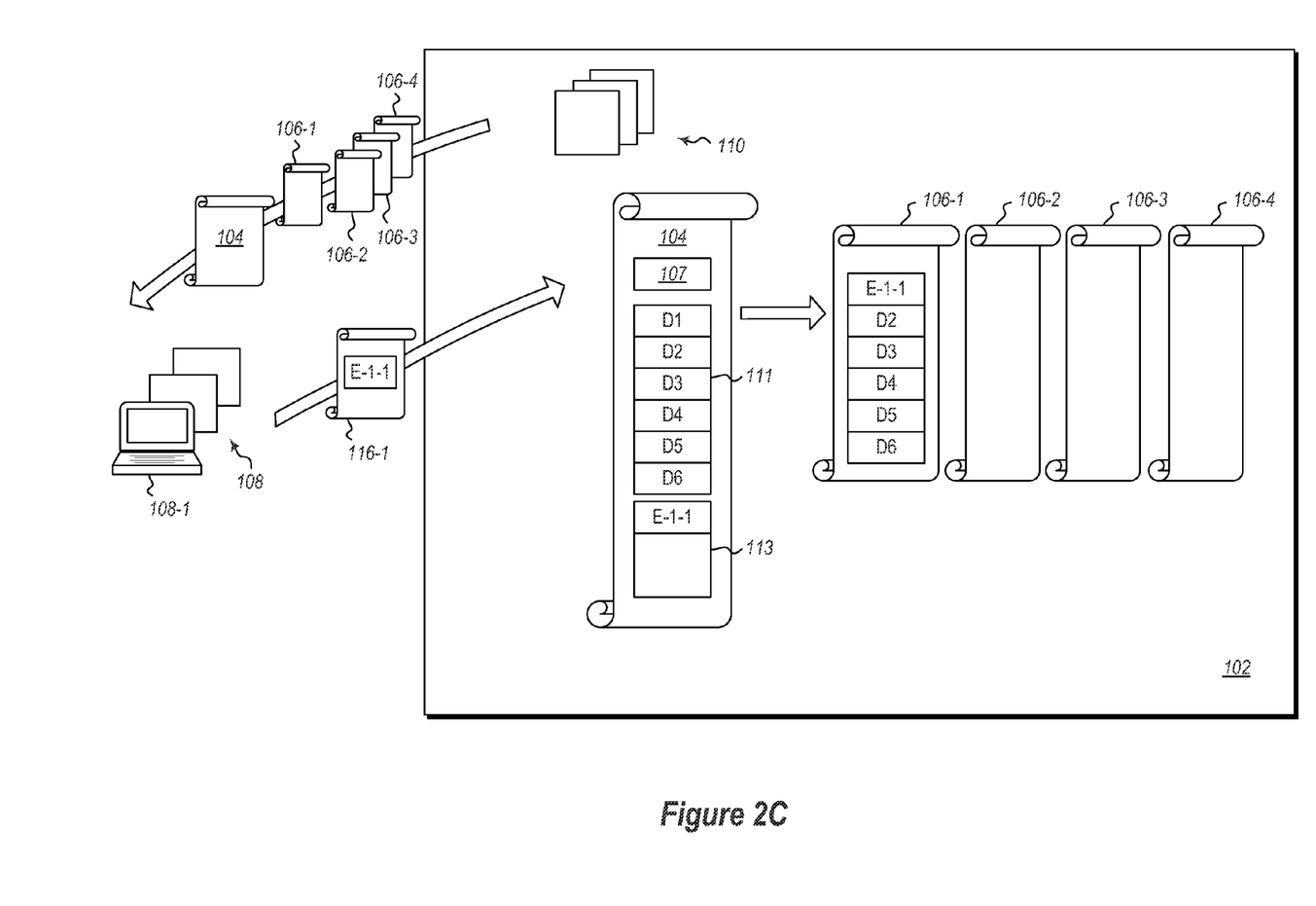
FIG. 2C illustrates additional details with regard to updating instance messages.

Referring now to FIG. 2C, additional details are illustrated. FIG. 2C illustrates that in the present example, it may be possible to create as many as four instance messages 106-1, 106-2, 106-3 and 106-4 as there are four instances in the example series. Each instance message can contain any exceptions for its corresponding instance as well as any unchanged default values for the particular instance.

While the examples above illustrate updating an event, it should be appreciated that in other embodiments, similar principles may be applied when adding a new event to a series.

In some embodiments, the server 102 may receive replies for one or more of the instance messages in the series of instance message 106. As a result, the server can update any instance messages for which a reply was received as well as the master message 104. Once updated, the updated instance message can be propagated to various other systems, such as the clients 108. In some embodiments, this results in the server 102 resending the master message 104 and all instance messages 106 to all clients 108.

In some embodiments, the server 102 may receive a similar (or maybe even the same) reply for each of the instance messages in the plurality of instance messages 106. The server 102 can then interpret the replies as a reply to the master message 104 (i.e. a reply to the entire series). In this case, the master message 104 default information could be updated as well. Essentially, embodiments are able to reverse engineer replies that are the same to all instance messages will be treated as a reply to the master message 104 at the server 102.

In some embodiments, the server 102 can receive a reply from a modern client to the master message 104. As a result, the server 102 propagates the reply to the various instance messages (as appropriate) and resends any updated instance messages to the clients. In some embodiments, this results in the server 102 resending the master message 104 and all instance messages 106 to all clients 108.

The following now illustrates additional details related to a framework in which embodiments may be implemented. In particular, the following illustrates an example of a modern system that is configured to natively implement non-patter recurrence messages but to still allow legacy clients to also use such functionality using their legacy mechanisms.

Embodiments may be implemented in a framework where there is a creation of a series of meetings that does not have a recurrence pattern. Unless explicitly stated, anything that applies to a traditional recurring series applies here as well. For example, an organizer should be able to: add an attendee to all instances; add an attendee only to one instance; cancel the whole series; cancel only one instance in the series; set the location for the whole series; change the location only in one instance; etc.

Conversely, in the illustrated example, operations that are not allowed on a recurring series (like adding an existing meeting to a series) will not be allowed here. One exception to this rule is the ability to have multiple instances on the same day (which is not currently allowed for a recurring series).

Using the functionality set forth herein, legacy clients will be able to see all instances of the series without changing their implementation. However, in the illustrated examples, they will be seen as individual appointments because in some legacy schema, it is not possible to represent such instances as a single appointment.

Figure 3A:
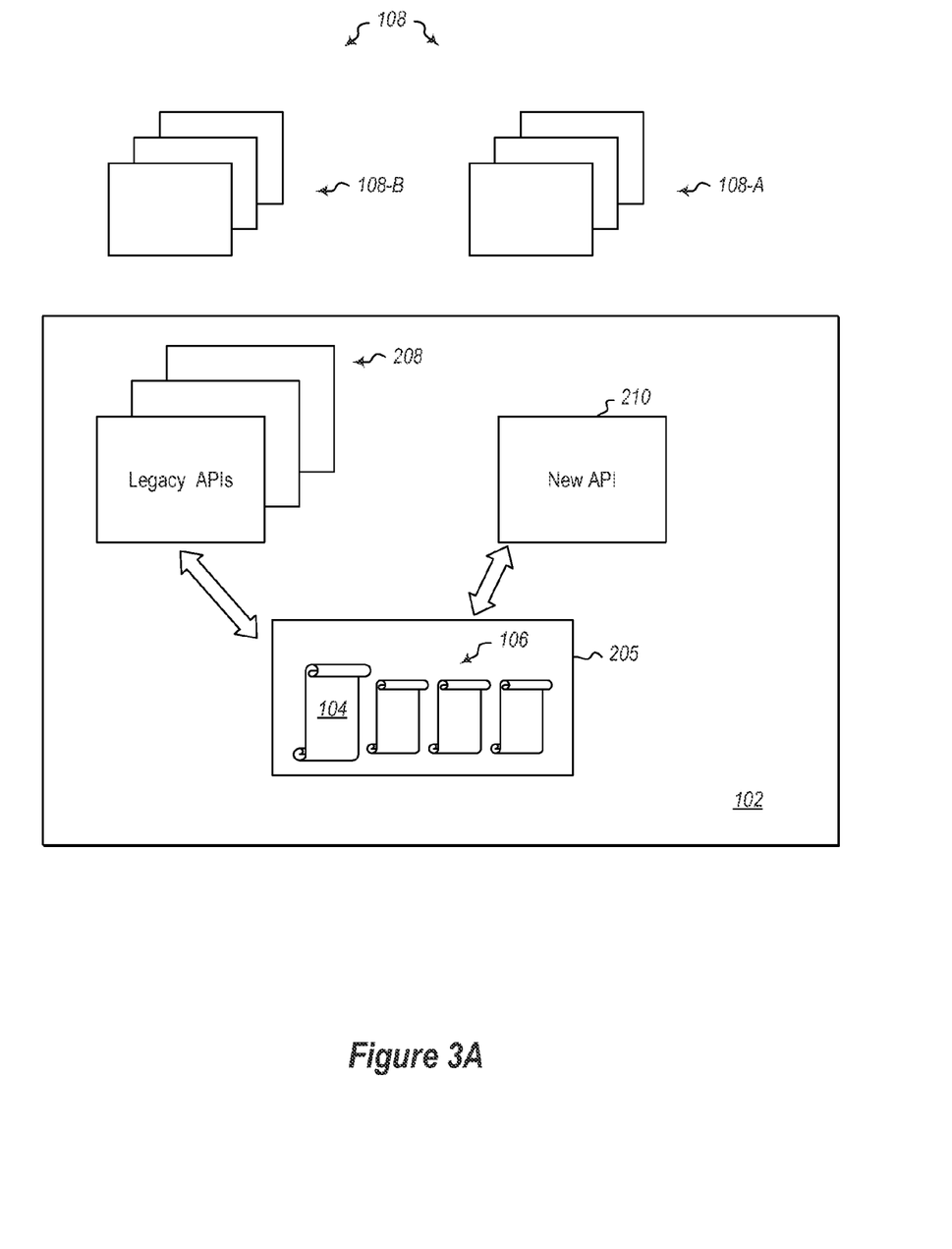
FIG. 3A illustrates a modern server that facilitates legacy clients.

Referring now to FIG. 4A, an example is illustrated which illustrates a single calendar folder 205. Both modern clients 108-A and legacy clients 108-B connect to this folder 205 on the server 102. But for legacy APIs 208 used by legacy clients, the server 102 hide the series master 104. The legacy clients can see the instance messages, where they can get default information and exception information on an event by event basis. Modern clients 108-A, using the new API can see both the series master 104 to obtain default information for the entire series of events and the instance messages 106 to obtain exception information for each event.

Figure 3B:
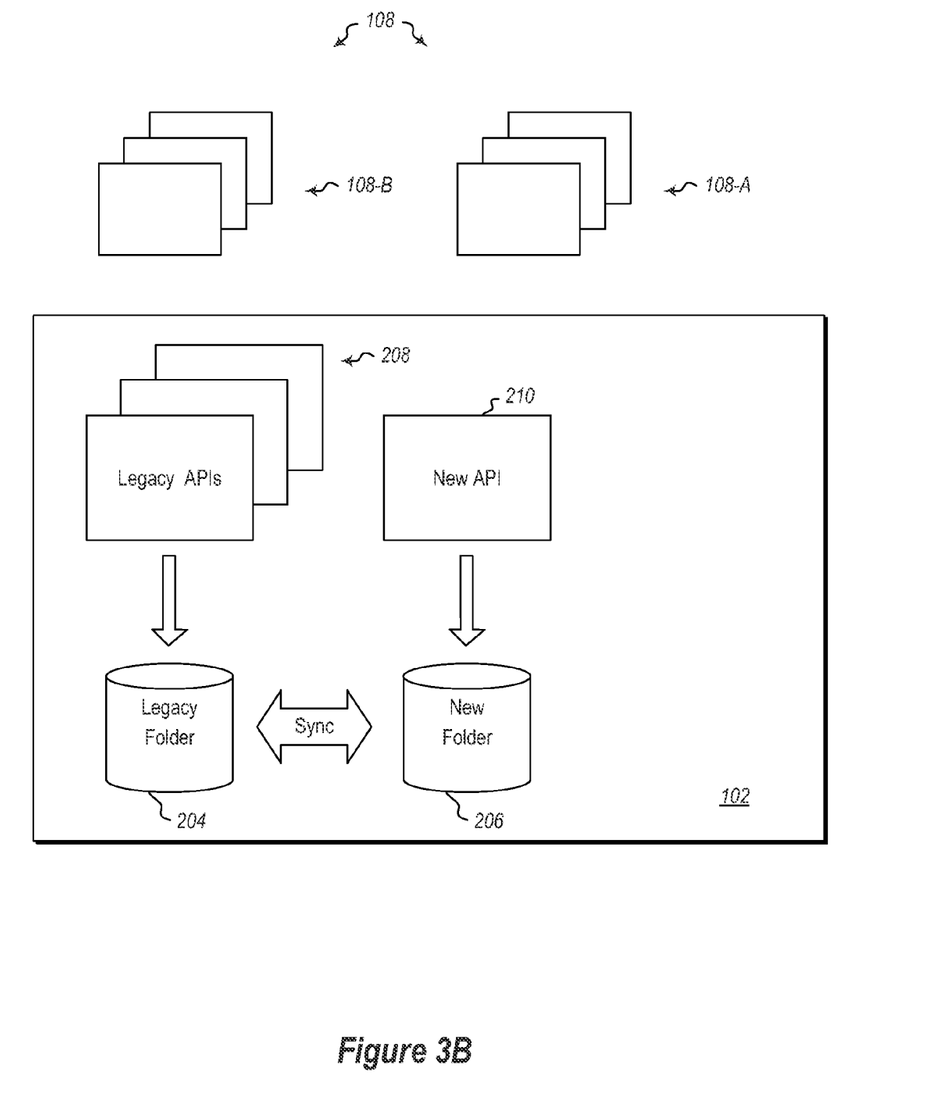
FIG. 3B illustrates a modern server that facilitates legacy clients.

Referring now to FIG. 4B, an alternative example is illustrates which illustrates a server 102 is illustrated with two calendar folders. A first legacy calendar folder 204 for legacy clients using legacy APIs 208 and a second new calendar folder 206 is for clients that use a new API 210.

The legacy calendar folder 204 continues to store items according to a legacy schema in a way that legacy clients can understand the items. For example, for legacy clients that do not understand non-pattern recurrences, these items will be stored as single items (such as the instance messages 106) instead of as part of a non-pattern recurrence series (such as the master message 104). The legacy calendar folder 204 will remain visible to legacy clients 108-B and they will interact with it in the same way that they have previously interacted with the legacy calendar folder 204.

The legacy calendar folder 204 will not be visible to modern clients 108-A, and the modern clients 108-A will not communicate with the legacy calendar folder 204. Instead, the modern clients 108-A will use the new calendar folder 206 with a new schema. This folder is not visible to the legacy clients 108-B (since it will contain items stored in a different way, which would not be understood by legacy protocols). It will only be accessible through the new API 210 and not through legacy APIs 208. Therefore, any details of how data is represented will be completely abstracted from clients. For example, non-pattern recurrences will be stored with a representation that has all the desired semantics and that will be exposed via the new API 210.

A sync mechanism to keep data updated on both folders may be implemented.

The following illustrates details regarding storing a non-pattern recurrence. Previously, a recurring series in a legacy system, such as a legacy Exchange Server from Microsoft Corporation of Redmond, Wash. has a top-level master which has information about the recurrence pattern, exceptions and is also used to represent the first instance of the series.

In contrast, a modern system may include an object (e.g., the master message 104) solely responsible for representing the non-pattern recurrence. It holds the following pieces of data:

The properties that are common to all instances (unless they are exceptions of course);
Information about when the series starts and when the series ends; and
A link to the instances of the non-pattern recurrence.

Figure 4:
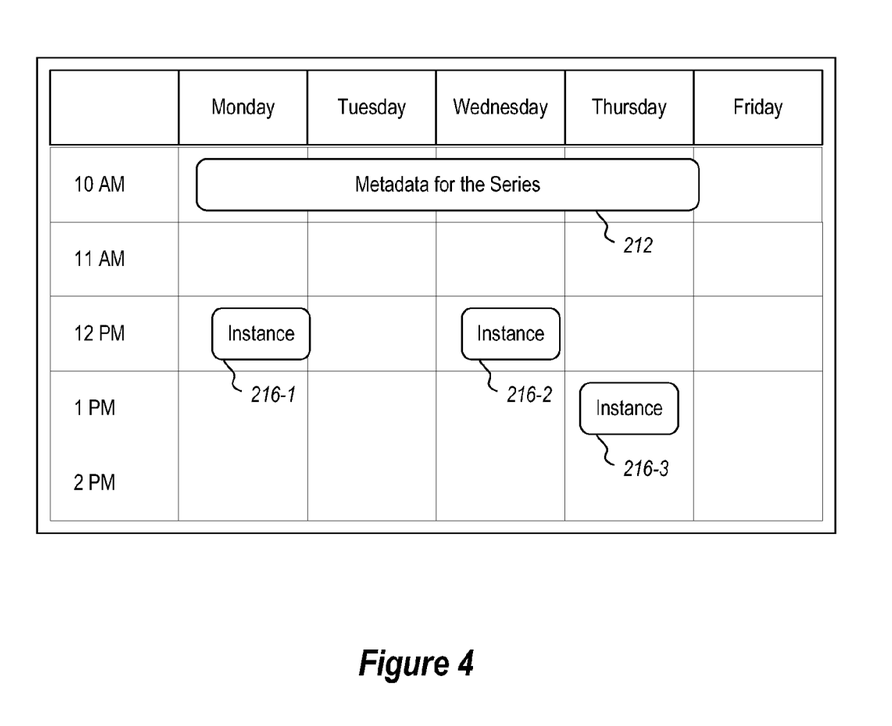
FIG. 4 illustrates a calendar view.

A difference between the non-pattern recurrence master and the "traditional recurring series" master is that this item is just metadata and only meant to be consumed by a modern server, such as a modern Exchange server available from Microsoft Corporation of Redmond, Wash. (and therefore it isn't visible to clients, modern or legacy). For example, FIG. 4 illustrates a representation of a non-pattern recurrence with instances 216-1, 216-2, and 216-3 on Monday, Wednesday and Thursday respectively. Only these items are visible to client. In some embodiments, during a calendar view embodiments internally query for both instance messages 106 and master messages 104 and then merge data from the master message 106 with instance data to get the latest state of the instance (in case background propagation has not yet caught up). At this point only instances are returned from calendar view API call.

Note that the item 212 holding the metadata begins on the same day of the first instance and ends at the last day. This allows for a more efficient query when obtaining a calendar view.

On legacy systems, when a client requests a view, two queries are made to the server 102: one for single and one for recurring items. Single item retrieval is simple: the legacy system can simply request the items that are in the desired window based on their start and end dates. When recurring items are in the picture, however, the server 102 has to examine the entire calendar and filter items in memory. This is because data for the series master also doubles as the first item—and therefore may be outside of the query window.

In contrast, in the non-pattern recurrence model, this is resolved by having the data related to the start and end of the series in the item 212 that represents the series. Since it stretches and shrinks with the instances, it is always in the same window as the instances 216-1, 216-2 and 216-3. This detail allows modern systems to have one single query and have every object of interest returned by it with no need to filter anything in memory.

As explained above, in one alternative embodiment, there are two calendar folders (i.e., a legacy calendar folder 204 and a new calendar folder 206), accessed by different clients (i.e., legacy clients 108-B and modern clients 108-A respectively). The two calendar folders have the same data (but represented in different ways as appropriate for the different clients).

Each time a modern client writes to the new calendar folder 206, an equivalent operation is executed against the legacy calendar folder 204 (and vice-versa). As each folder has a different data model, an operation cannot be simply replayed. Instead, there is a translation into equivalent operations.

For instance, assume that, in the new model, exceptions of a recurring series are treated like top-level partial items (like in non-pattern recurrences) and that a legacy API (from among the legacy APIs 208) is creating an exception.

Conversely, if a new API 210 (which operates against the new folder 206) had created the partial item for the recurring series exception, synchronization operations would have to update the corresponding item on the legacy folder by creating an attachment.

Thus, after each create/update/delete operation, embodiments will take the object as a whole and fully update the equivalent object on the other folder.

Instances of non-pattern recurrences are full items and contain all data required for them to be displayed. This includes series information that will be used only by the modern clients 108-A and all the properties expected by legacy clients 108-B.

To guarantee the backwards compatibility, data that would be only in the master message 104 is propagated to all the instance messages 106 as illustrated above.

Creating or modifying a non-pattern recurrence as a series is done through the new API 210. In this scenario, embodiments are aware of series versus exceptions and perform bulk updates whenever appropriated. There will be a master item, which will only be understood by the new API. MAPI clients will not see it at all.

Thus, for backwards compatibility, each instance of a series will have all the properties necessary to display the item as a single item. Changes to the series as a whole (like changing the subject for all instances) will be written against the master message. Embodiments will attempt to update the other instances inline with the save. Updates that cannot be performed online (either because of failures, because there are too many instances, or for other reasons) will be done in the background process.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
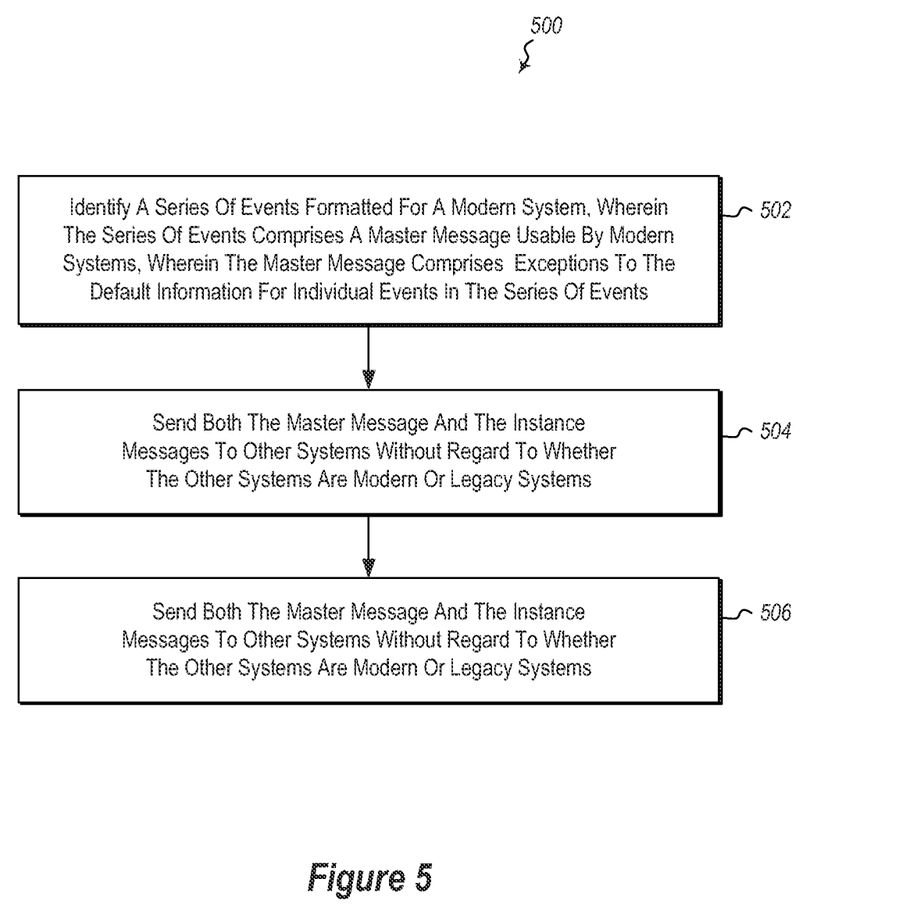
FIG. 5 illustrates a method for facilitating usage with both modern and legacy systems.

Referring now to FIG. 5, a method 500 is illustrated. The method 500 may be practiced in a computing environment and includes acts for facilitating usage with both modern and legacy systems. The method 500 includes identifying a series of events formatted for a modern system, wherein the series of events comprises a master message usable by modern systems, wherein the master message comprises default information for all events in the series (act 502).

The method 500 further includes identifying a plurality of instance messages, wherein each of the instance messages comprise default information and exception information for a given event in the series of events (act 504).

The method 500 further includes sending both the master message and the instance messages to other systems without regard to whether the other systems are modern or legacy (act 506).

The method 500 may further include creating the instance messages using the master message and the default information contained therein.

The method 500 may further include creating the instance messages using the default information from the master message and exception information received from a user.

The method 500 may be practiced where creating the instance messages includes, for each instance message, identifying one or more properties that are not yet defined with default property values from the master message and that have not been defined as valid exceptions to the default properties from the master message and propagating a default property value from a corresponding property of the master message to each of the identified properties.

The method 500 may further include receiving a similar (or even the same) reply for each of the instance messages in the plurality of instance message and as a result interpreting the replies as a reply to the master message (i.e. the entire series). As a result, the master message can be updated. The updated master message, and in many cases the instance messages as well, can be resent to the systems.

The method 500 may further include receiving replies for one or more of the instance messages in the plurality of instance message and as a result updating the instance messages for which a reply was received.

The method 500 may further include receiving one or more replies to the master message and as a result updating one or more of the instance messages to propagate information from the reply to the one or more of the instance messages.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more hardware storage devices having stored thereon instructions that are executable by one or more processors of a computer system to update event series data using systems of different types, including instructions that cause the computer system to perform at least the following:
   identify a master message representing a series of events formatted for a system of a first type, wherein the master message is usable by systems of the first type, and wherein the master message comprises default information for all events in the series;
   generate a plurality of instance messages from the master message, wherein each of the instance messages comprises default information and exception information for a given event in the series of events;
   send both the master message and the plurality of instance messages to other systems without regard to whether the other systems are systems of the first type, or whether the other systems are systems of a second type that utilize only the plurality of instance messages; and
   based at least on sending both the master message and the plurality of instance messages to the other systems, perform one or more of:
      receive a first reply comprising a first update for one or more of the instance messages in the plurality of instance messages from a system of the second type, and as a result update the master message and the one or more instance messages for which the first reply was received, and send the updated one or more instance messages to one or more of the other systems that are systems of the second type; or
      receive a second reply comprising a second update to the master message from a system of the first type, and as a result propagate the second update to one or more of the instance messages, and send the updated one or more instance messages to one or more of the other systems that are systems of the second type.

2. The computer program product of claim 1, wherein the instructions are also executable by the one or more processors to cause the computer system to create the plurality of instance messages using the master message and the default information contained therein.

3. The computer program product of claim 2, wherein the instructions are also executable by the one or more processors to cause the computer system to:

for each instance message, identify one or more properties that are not yet defined with default property values from the master message and that have not been defined as valid exceptions to the default properties from the master message; and propagate a default property value from a corresponding property of the master message to each of the identified properties.

4. The computer program product of claim 1, wherein the instructions are also executable by the one or more processors to cause the computer system to create the plurality of instance messages using the default information from the master message and exception information received from a user.

5. The computer program product of claim 1, wherein the instructions are also executable by the one or more processors to cause the computer system to receive a similar reply for each of the instance messages in the plurality of instance messages and as a result interpret the replies as a reply to the master message.

6. In a computing environment, a method of facilitating usage with both systems of a first type that utilize master messages and systems of a second type that utilize instance messages, the method comprising:

identifying a master message representing a series of events formatted for a system of the first type, wherein the series of events comprises a master message that comprises default information for all events in the series;

generating a plurality of instance messages, wherein each of the instance messages comprises default information and exception information for a given event in the series of events;

sending both the master message and the instance messages to other systems without regard to whether the other systems are systems of the first type or systems of the second type; and based at least on sending both the master message and the plurality of instance messages to the other systems, performing one or more of:

receive a first reply comprising a first update for one or more of the instance messages in the plurality of instance messages from a system of the second type, and as a result update the master message and the one or more instance messages for which the first reply was received, and send the updated one or more instance messages to one or more of the other systems that are systems of the second type; or receive a second reply comprising a second update to the master message from a system of the first type, and as a result propagate the second update to one or more of the instance messages, and send the updated one or more instance messages to one or more of the other systems that are systems of the second type.

7. The method of claim 6, further comprising creating the instance messages using the master message and the default information contained therein.

8. The method of claim 7, wherein creating the instance messages comprises:

for each instance message, identifying one or more properties that are not yet defined with default property values from the master message and that have not been defined as valid exceptions to the default properties from the master message; and propagating a default property value from a corresponding property of the master message to each of the identified properties.

9. The method of claim 6, further comprising creating the instance messages using the default information from the master message and exception information received from a user.

10. The method of claim 6, further comprising receiving a similar reply for each of the instance messages in the plurality of instance messages and as a result interpreting the replies as a reply to the master message.

11. A system for facilitating usage with both systems of a first type that utilize master messages and systems of a second type that utilize instance messages, the system comprising:

one or more processors; and one or more hardware storage devices, wherein the one or more hardware storage devices comprise computer-executable instructions that when executed by at least one of the one or more processors cause the system to perform the following:

identifying a master message representing a series of events formatted for a system of the first type, wherein the master message comprises default information for all events in the series;

generating a plurality of instance messages from the master message, wherein each of the instance messages comprises default information and exception information for a given event in the series of events;

sending both the master message and the instance messages to other systems without regard to whether the other systems are systems of the first type of systems of the second type; and based at least on sending both the master message and the plurality of instance messages to the other systems, perform one or more of:

receive a first reply comprising a first update for one or more of the instance messages in the plurality of instance messages from a system of the second type, and as a result update the master message and the one or more instance messages for which the first reply was received, and send the updated one or more instance messages to one or more of the other systems that are systems of the second type; or receive a second reply comprising a second update to the master message from a system of the first type, and as a result propagate the second update to one or more of the instance messages, and send the updated one or more instance messages to one or more of the other systems that are systems of the second type.

12. The system of claim 11, wherein the one or more hardware storage devices also comprise computer-executable instructions that when executed by at least one of the one or more processors cause the system to create the instance messages using the master message and the default information contained therein.

13. The system of claim 12, wherein creating the instance messages comprises:

for each instance message, identifying one or more properties that are not yet defined with default property values from the master message and that have not been defined as valid exceptions to the default properties from the master message; and propagating a default property value from a corresponding property of the master message to each of the identified properties.

14. The system of claim 11, wherein the one or more hardware storage devices also comprise computer-executable instructions that when executed by at least one of the one or more processors cause the system to create the instance messages using the default information from the master message and exception information received from a user.

15. The system of claim 11, wherein the one or more hardware storage devices also comprise computer-executable instructions that when executed by at least one of the one or more processors cause the system to receive a similar reply for each of the instance messages in the plurality of instance messages and as a result interpret the replies as a reply to the master message.

16. The system of claim 11, wherein sending the updated one or more instance messages to one or more of the other systems that are systems of the second type based on the first reply also includes sending the updated master message to at least one or more of the other systems that are systems of the first type.

17. The system of claim 11, wherein the one or more hardware storage devices also comprise computer-executable instructions that when executed by at least one of the one or more processors cause the system to, based on receiving the second reply to the master message, update the master message and send the updated master message to at least one or more of the other systems that are systems of the first type.

18. The system of claim 11, wherein one or more of the first update or the second update comprises an exception to recurring information.

19. The system of claim 11, updating the master message and the one or more instance messages comprises updating overriding default information with exception information.

20. The system of claim 11, wherein propagating the second update to one or more of the instance messages comprising propagating exception information to the one or more of the instance messages.

21. The system of claim 11, wherein generating the plurality of instance messages from the master message comprises generating at least one instance message that includes exception information from the master message.

* * * * *